United States Patent [19]

Suzuki et al.

[11] Patent Number: 5,045,032
[45] Date of Patent: Sep. 3, 1991

[54] CHAIN GUIDE HAVING SHOE MADE OF PLASTICS

[75] Inventors: Tadasu Suzuki, Kawagoe; Atsushi Kumakura, Tokorozawa, both of Japan

[73] Assignee: Tsubakimoto Chain Co., Osaka, Japan

[21] Appl. No.: 530,549

[22] Filed: May 29, 1990

[30] Foreign Application Priority Data

May 31, 1989 [JP] Japan .................. 1-62461[U]

[51] Int. Cl.$^5$ .................................. F16H 7/08
[52] U.S. Cl. ............................................ 474/140
[58] Field of Search ............. 474/140, 144, 145, 146, 474/147

[56] References Cited

U.S. PATENT DOCUMENTS 4,832,664 5/1989 Gröger et al. ............ 474/140 X
4,921,472 5/1990 Young ....................... 474/140 X Primary Examiner—William P. Neuder
Attorney, Agent, or Firm—Howson & Howson

[57] ABSTRACT

A chain guide having a shoe made of plastics is disclosed. It has a pair of L-shaped side engaging members adapted to engage with the respective sides of the arm and a U-shaped hook member adapted to engage with the chain-introducing end of the arm.

4 Claims, 5 Drawing Sheets

CHAIN GUIDE HAVING SHOE MADE OF PLASTICS

FIELD OF THE INVENTION

This invention relates to a guide for a chain which is adapted to run endlessly.

BACKGROUND OF INVENTION

Conventionally, a guide for a timing chain for valves in an automotive engine is made of a metallic arm 20 which is either fixed or pivotably mounted with a rubber shoe 21 adhesively bonded thereto, as shown in FIG. 15. The shoe 21 being made of rubber, the conventional chain guide has the following drawbacks:

1. Rubber lacks heat-resistant property; and when the temperature of environment reaches as high as 120 degrees centigrade, it is liable to be damaged by the chain C.

2. Rubber also lacks mechanical strength; and the guiding walls 23 are susceptible to damage by the chain C as illustrated in FIG. 17.

3. With the passage of time, the rubber shoe 21 is likely to be delaminated from the arm 20.

SUMMARY OF INVENTION

The present invention provides, in the first place, a chain guide comprising a shoe made of plastics having a pair of L-shaped side engaging members adapted to engage with the respective sides of an arm and a U-shaped hook member adapted to engage with the chain-introducing end of said arm.

The present invention provide secondly a chain guide comprising a shoe made of plastics having a pair of L-shaped side engaging members adapted to engage with the respective sides of an arm, a U-shaped hook member adapted to engage with the chain-introducing end of said arm and a projection adapted to be inserted into a hole formed in said arm.

The present invention provides thirdly a chain guide comprising a shoe made of plastics having a pair of L-shaped side engaging members adapted to engage with the respective sides of an arm, a U-shaped hook member adapted to engage with the chain-introducing end of said arm and a projection adapted to be inserted into a bifurcated portion formed at the chain-introducing end of said arm.

The present invention provides fourthly a chain guide comprising a shoe made of plastics having a pair of snap-fit members adapted to engage with the respective sides of an arm and a U-shaped hook member adapted to engage with the chain-introducing end of said arm.

Since the shoe is made of plastics, heat-resistant, anti-wear properties and mechanical strength may be substantially improved.

In case of the first invention, the shoe may be mounted to the arm by means of a pair of the side engaging members and the U-shaped hook member. In case of the second invention, the shoe may be mounted to the arm by means of a pair of the side engaging members, the U-shaped hook member and the projecion formed in the shoe. And according to the third invention, the shoe may be fixed to the arm by means of a pair of the side engaging members, the U-shaped hook member and the projection which is forcibly inserted into the bifurcated portion formed at the chain-introducing end of the arm. And in case of the fourth invention, the shoe may be mounted to the arm by the snap-fit members and the hook member. No adhesive bonding being involved, mounting of the shoe is much easier; and the possible displacement or delamination of the shoe relative to the arm may effectively be prevented. Furthermore, possible elongation of the shoe due to heat may be accommodated as the shoe is slidable relative to the arm.

PREFERRED EMBODIMENTS

Figure 1:
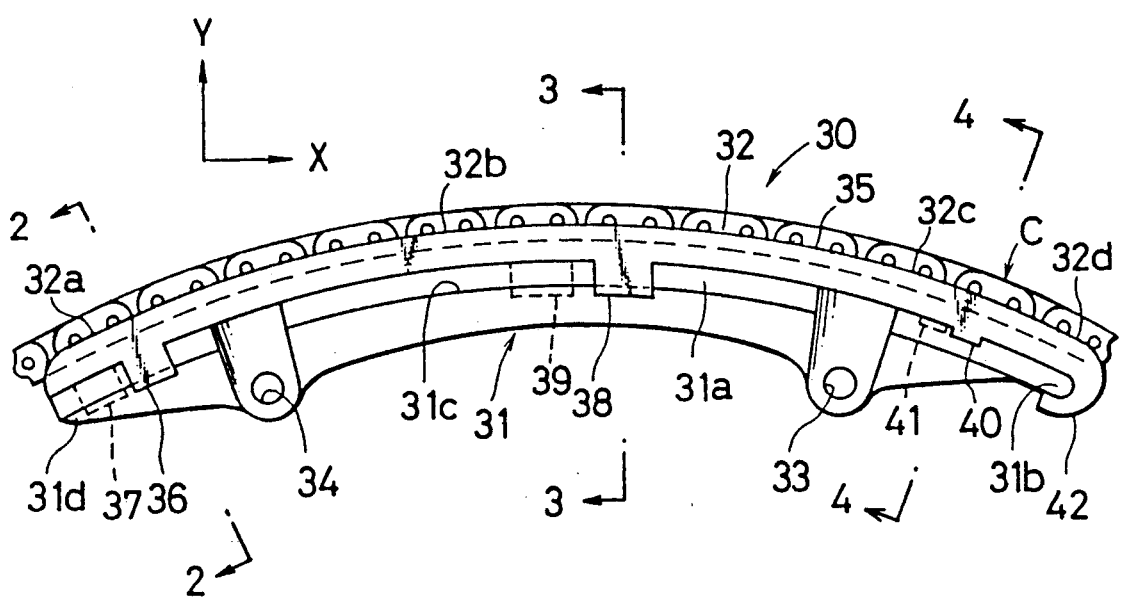
FIG. 1 is a side view of a chain guide according to a first embodiment of the present invention.
Figure 2:
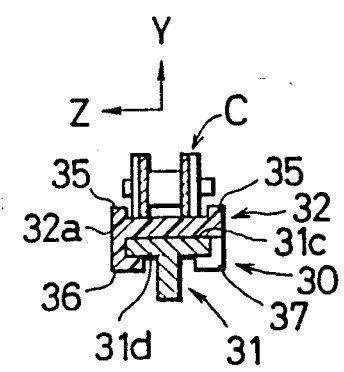
FIG. 2 is a section at line 2—2 of FIG. 1.
Figure 3:
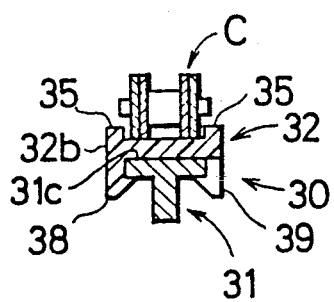
FIG. 3 is a section at line 3—3 of FIG. 1.
Figure 4:
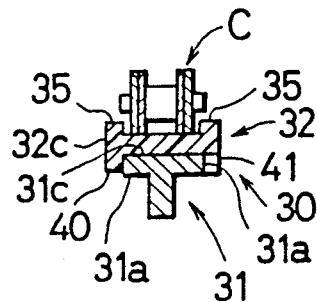
FIG. 4 is a section at line 4—4 of FIG. 1.
Figure 5:
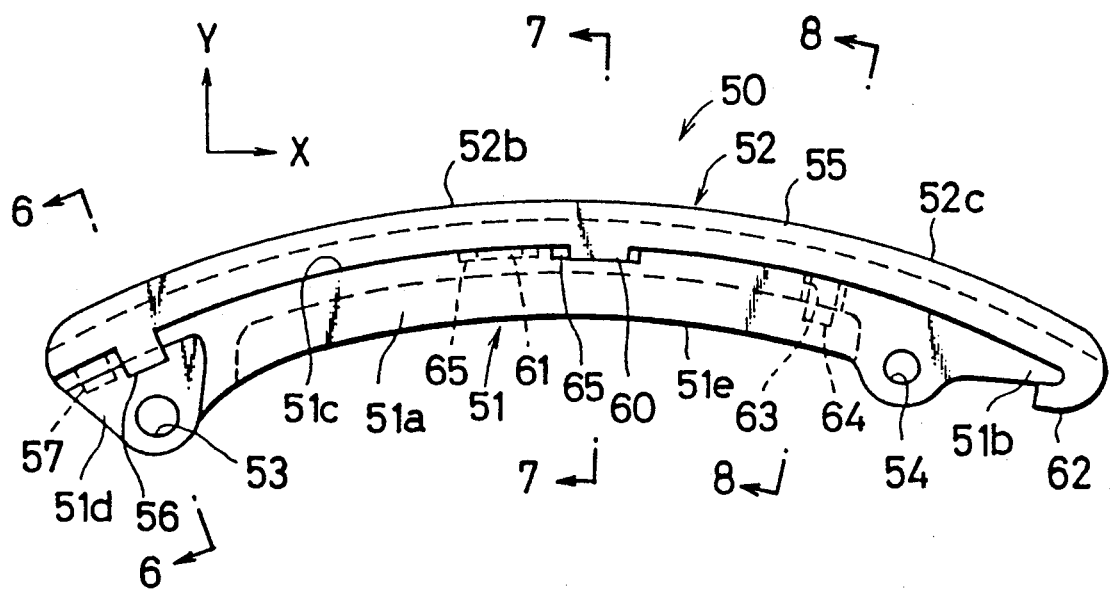
FIG. 5 is a side view of a chain guide according to a second embodiment of this invention.
Figure 6:
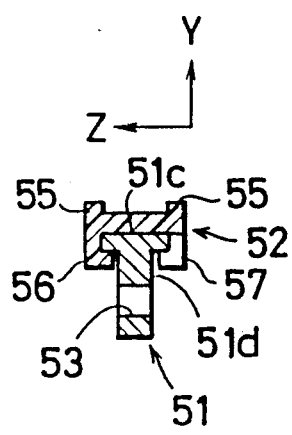
FIG. 6 is a section at line 6—6 of FIG. 5.
Figure 7:
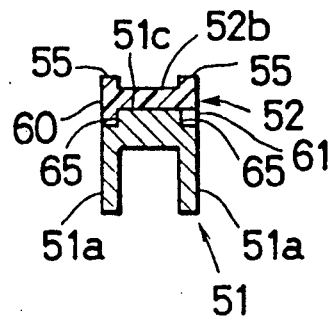
FIG. 7 is a section at line 7—7 of FIG. 5.
Figure 8:
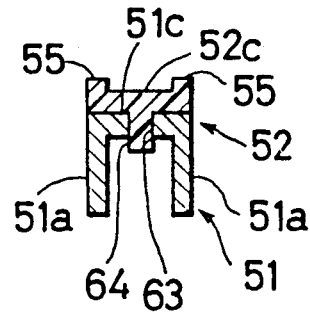
FIG. 8 is a section at line 4—4 of FIG. 5.

In FIGS. 1 to 4, the chain guide 30 is used for guiding a timing chain C for operating valves in an automotive engine, and comprises an arcuate arm 31 and shoe 32. The chain C runs from right to left in FIG. 1.

The arm 31 is made of metal having a T-shaped section and is formed with holes 33, 34 for mounting to a fixed member (not shown). For mounting the arm 31 pivotably, only the hole 33 is utilized; and for mounting the arm 31 fixedly, both holes 33, 34 are utilized. When the arm 31 is pivotably mounted, the free end thereof is urged by means of a tensioner (not shown) toward the chain C.

The shoe 32 is made of plastics (e.g. engineering plastics) having a pair of side walls 35, 35 and its section is generally U-shaped. At the lefthand end 32a, a pair of L-shaped opposing side engaging members 36, 37 are formed; at the intermediate position 32b, a pair of hook-shaped snap-fit members 38, 39 are formed; at the portion 32c adjacent the righthand end, a pair of side engaging members 40, 41 are formed so as to engage with the sides 31a, 31a; and at the right-hand end 32b, a U-shaped hook member 42 is formed so as to surround the righthand (chain-introducing) end of the arm 31. The pairs of the side engaging members 36, 37, 38, 39, 40, 41 are staggered respectively in the running direction of the chain C (namely X axis in FIG. 1).

For mounting the shoe 32 on the arm 31, the side engaging members 36, 37 are slidingly fit to the lefthand end 31d of the arm 31 and the hook member 42 is engaged with the righthand end 31b. And thereafter, the snap-fit members 38, 39 are forced to engage with the arm 31 simultaneously causing the side engaging members 40, 41 to engage with the sides 31a, 31a of the arm 31.

The shoe 32 thus mounted on the arcuate surface 31c of the arm 31 is subject to various forces tending to cause the shoe 32 to move relative to the arm 31. However, the movement along the X axis may be prevented by the hook member 42; the movement perpendicular to the arcuate surface 31c (Y axis) may be prevented by the side engaging members 36, 37, snap-fit members 38, 39 and the hook member 42; and the movement perpendicular to the drawings (Z axis) may be prevented by the side engaging members 36, 37, the snap-fit members 38, 39 and the side engaging members 40, 41.

Consequently, the movement of the shoe 32 relative to the arm 31 may be effectively prevented. Moreover, since the shoe 32 is made of plastics, it is heat-resistant, wear-resistant and the mechanical strength is superior, which ensures that the shoe may not be damaged by the chain C or due to heat generated during use.

In the next place, FIGS. 5 to 8 illustrate a chain guide 50 of a second embodiment. The arm 51 is made of metal having a T-shaped section near the left-hand end 51d; and the intermediate portion 51e and the righthand end 51b have U-shaped sections. Near both ends 51d, 51b, mounting holes 53, 54 are formed as was the case with the first embodiment.

The shoe 52 is made of plastics (e.g. engineering plastics) having a pair of side walls 55, 55 and its section is generally U-shaped. At the lefthand end, a pair of L-shaped opposing side engaging members 56, 57 are formed; at the intermediate portion 52b, a pair of side engaging members 60, 61 are formed so as to fit into the recesses 65, 65 formed in the sides 51a of the arm 51; at the portion 52c adjacent the righthand end, a projection 63 is formed so as to fit into a hole 63 formed in the arm 51; and at the right-hand end, a U-shaped hook member 62 is formed so as to surround the righthand end 51b of the arm 51. The pairs of the side engaging members 56, 57, 60, 61 are staggered respectively in the running direction of the chain C (namely X axis in FIG. 5).

For mounting the shoe 52 on the arm 51, the side engaging members 56, 57 are slidingly fit to the lefthand end 51d of the arm 51 and the hook member 62 is engaged with the righthand end 51b. And thereafter, the side engaging members 60, 61 are fit into the recesses 65, 65 simultaneously forcing the projection 64 into the hole 63.

The shoe 52 thus mounted on the arcuate surface 51c of the arm 51 is subject to various forces tending to cause the shoe 52 to move relative to the arm 51. However, the movement along the X axis may be prevented by the hook member 62 and the projection 64; the movement perpendicular to the arcuate surface 51c (Y axis) may be prevented by the side engaging members 56, 57, and the hook member 62; and the movement perpendicular to the drawings (Z axis) may be prevented by the side engaging members 56, 57, the side engaging members 60, 61 and the projection 64.

Consequently, the second embodiment is possessed of all the advantages of the first embodiment; and in addition, the possible movements along the X, Y axes may more effectively be prevented by the projection 64.

Figure 9:
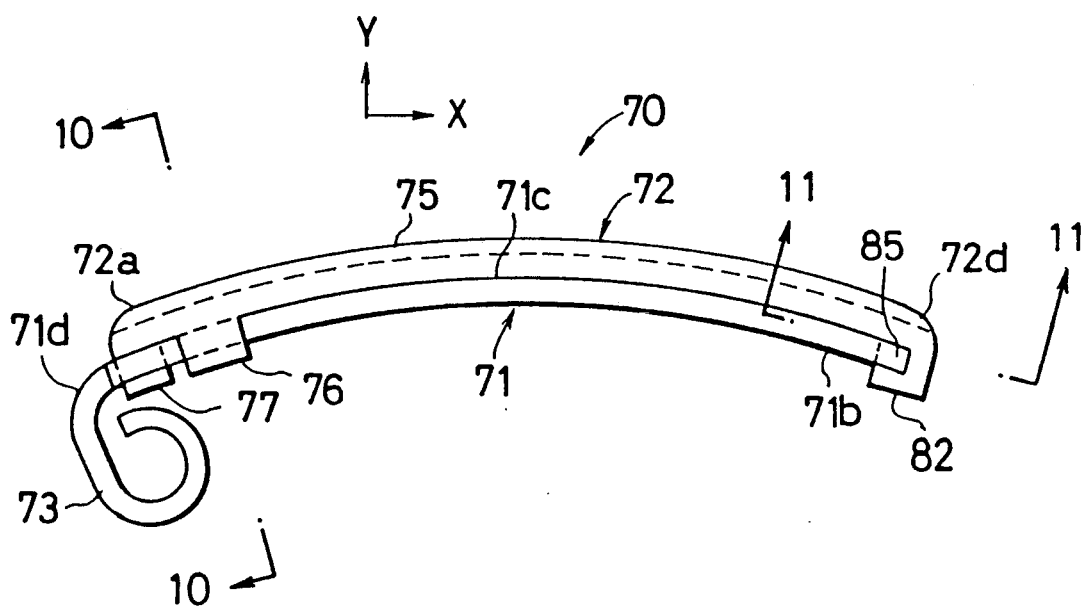
FIG. 9 is a side view of a chain guide according to a third embodiment of this invention.
Figure 10:
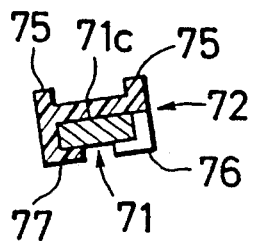
FIG. 10 is a section at line 10—10 of FIG. 9.
Figure 11:
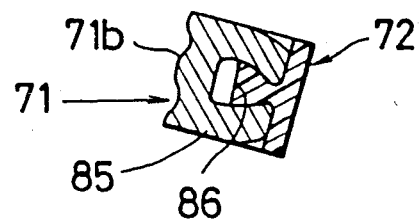
FIG. 11 is a section at line 11—11 of FIG. 9.

Next, FIGS. 9 to 11 show a third embodiment of this invention. The chain guide 70 comprises an elongated arm of an arcuate plate 71 and a shoe 72.

The arm 71 is made of metal and has a curl 73 at the lefthand end 71d for pivotably mounting to a fixed member (not shown).

The shoe 72 is made of plastics (e.g. engineering plastics) having a pair of side walls 75, 75 and its section is generally U-shaped. At the lefthand end, a pair of L-shaped opposing side engaging members 76, 77 are formed; and at the righthand end, a U-shaped hook member 82 is formed so as to surround the righthand end 71b of the arm 71. The pair of the side engaging members 76, 77 are staggered in the running direction of the chain C (namely X axis in FIG. 9). In addition, at the intermediate position of the hook member 82, a projection 86 is formed so as to be forced into the recess formed by a bifurcated portion 85 formed at the righthand end 71b of the arm 71. The bifurcated portion 85 is plastically deformable.

For mounting the shoe 72 on the arm 71, the side engaging members 76, 77 are slidingly fit to the lefthand end 71d of the arm 51 and the hook member 82 is engaged with the righthand end 71b. And thereafter, the bifurcated portion 85 is forced so as to sandwich the projection 86 from both sides.

The shoe 72 thus mounted on the arcuate surface 71c of the arm 71 is subject to various forces tending to cause the shoe 72 to move relative to the arm 71. However, the movement along the X axis may be prevented by the hook member 82; the movement perpendicular to the arcuate surface 71c (Y axis) may be prevented by the side engaging members 76, 77, and the hook member 82; and the movement perpendicular to the drawings (Z axis) may be prevented by the side engaging members 76, 77 and the projection 86.

Consequently, the third embodiment is possessed of all the advantages of the first embodiment; and in addition, it has the advantage that the structure can be substantially simplified.

Figure 12:
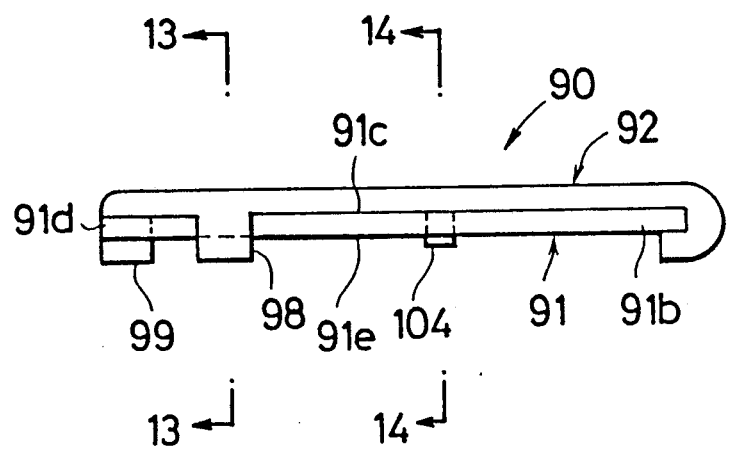
FIG. 12 is a side view of a chain guide according to a fourth embodiment of this invention.
Figure 13:
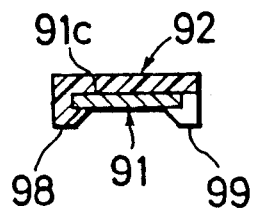
FIG. 13 is a section at line 13—13 of FIG. 12.
Figure 14:
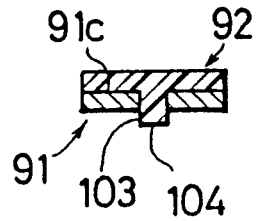
FIG. 14 is a section at line 14—14 of FIG. 12.
Figure 15:
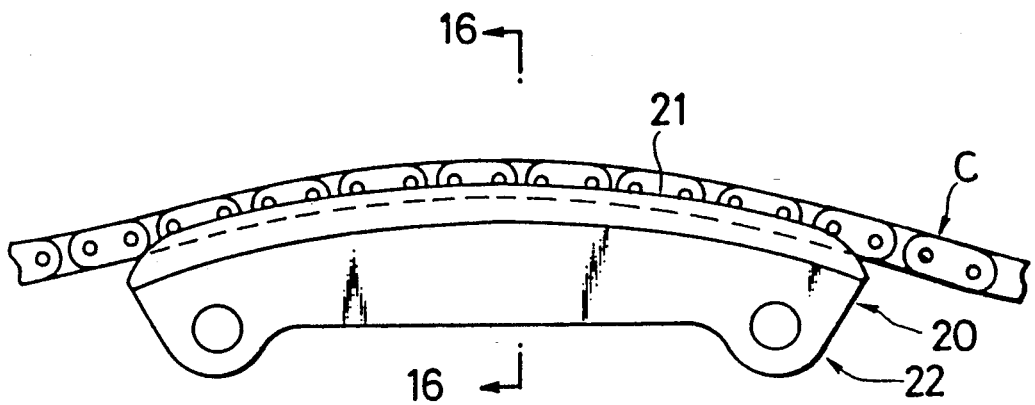
FIG. 15 is a side view of a conventional chain guide.
Figure 16:
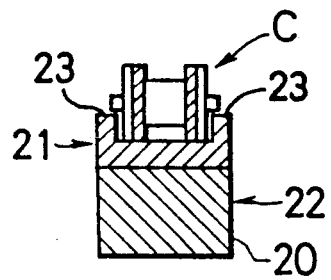
FIG. 16 is a section at line 16—16 of FIG. 15.
Figure 17:
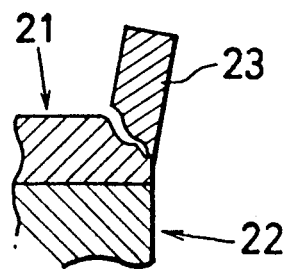
FIG. 17 is an enlarged section illustrating breakage of the guiding wall.

Lastly, FIGS. 12 and 13 pertain to a fourth and the last embodiment of this invention. The chain guide 90 comprises an elongated plate-like arm 91 and a shoe 92.

The shoe 92 is made of plastics (e.g. engineering plastics); so as to engage with the lefthand end 91d of the arm 91, a pair of snap-fit, hook-shaped members 98, 99 are formed; at the intermediate portion 92b, a projection 104 is formed so as to be inserted into a hole 103 formed at the intermediate portion 91e of the arm 91; and at the righthand end, a U-shaped hook member 102 is formed so as to surround the righthand end 91b of the arm 91. The pair of the snap-fit members 98, 99 are staggered in the running direction of the chain.

For mounting the shoe 92 on the arm 91, the snap-fit members 98, 99 are snap-fit to the lefthand end 91d of the arm 91 and the hook member 92 is engaged with the righthand end 91b. And thereafter, the projection 104 is forced into the hole 103.

The shoe 92 thus mounted on the surface 91c of the arm 91 is subject to various forces tending to cause the shoe 92 to move relative to the arm 91. However, the movement along the X axis may be prevented by the hook member 102 and the projection 104; the movement perpendicular to the surface 91c (Y axis) may be prevented by the snap-fit members 98, 99 and the hook member 102; and the movement perpendicular to the drawings (Z axis) may be prevented by the snap-fit members 98, 99 and the projection 104.

Consequently, the third embodiment is possessed of all the advantages of the first embodiment; and in addition, it has the advantage that the structure can be substantially simplified. The chain guide 90 is suitable for guiding the chain for a relatively short distance.

What is claimed is:

1. A chain guide comprising a shoe made of plastics having a pair of L-shaped side engaging members adapted to engage with the respective sides of a T-shaped arm and a U-shaped hook member adapted to engage with the chain-introducing end of said arm, wherein each of said L-shaped side engaging members comprises a flexible, resilient leg portion and a hook-shaped snap fit member having cam surface-providing means engageable with said T-shaped arm for urging its L-shaped side engaging member to flex outwardly when the shoe is forcibly engaged with said T-shaped arm in a direction perpendicular to the length of the arm, whereby said hook-shaped members snap fit onto said T-shaped arm.

2. A chain guide comprising a shoe made of plastics having a pair of L-shaped side engaging members adapted to engage with the respective sides of a T-shaped arm, a U-shaped hook member adapted to engage with the chain-introducing end of said arm and a projection adapted to be inserted into a hole formed in said arm, wherein each of said L-shaped side engaging members comprises a flexible, resilient leg portion and a hook-shaped snap fit member having cam surface-providing means engageable with said T-shaped arm for urging its L-shaped side engaging member to flex outwardly when the shoe is forcibly engaged with said T-shaped arm in a direction perpendicular to the length of the arm, whereby said hook-shaped members snap fit onto said T-shaped arm.

3. A chain guide comprising a shoe made of plastics having a pair of L-shaped side engaging members adapted to engage with the respective sides of a T-shaped arm, a U-shaped hook member adapted to engage with the chain-introducing end of said arm and a projection adapted to be inserted into a bifurcated portion formed at the chain-introducing end of said arm, wherein each of said L-shaped side engaging members comprises a flexible, resilient leg portion and a hook-shaped snap fit member having cam surface-providing means engageable with said T-shaped arm for urging its L-shaped side engaging member to flex outwardly when the shoe is forcibly engaged with said T-shaped arm in a direction perpendicular to the length of the arm, whereby said hook-shaped members snap fit onto said T-shaped arm.

4. A chain guide comprising a shoe made of plastics having a pair of snap-fit members adapted to engage with the respective sides of an arm and a U-shaped hook member adapted to engage with the chain-introducing end of said arm, wherein each of said snap-fit members has cam surface-providing means engageable with said arm for urging the snap-fit member outwardly when the shoe is forcibly engaged with said arm in a direction perpendicular to the length of the arm, whereby said snap-fit members snap onto said arm.

* * * * *